C. J. HANSEN.
BICYCLE STAND.
APPLICATION FILED OCT. 26, 1908.

921,242.

Patented May 11, 1909.
2 SHEETS—SHEET 1.

WITNESSES
Mary Sholderer
W. R. Sampson

Carl J. Hansen INVENTOR

BY
L. L. Westfall his ATTORNEY

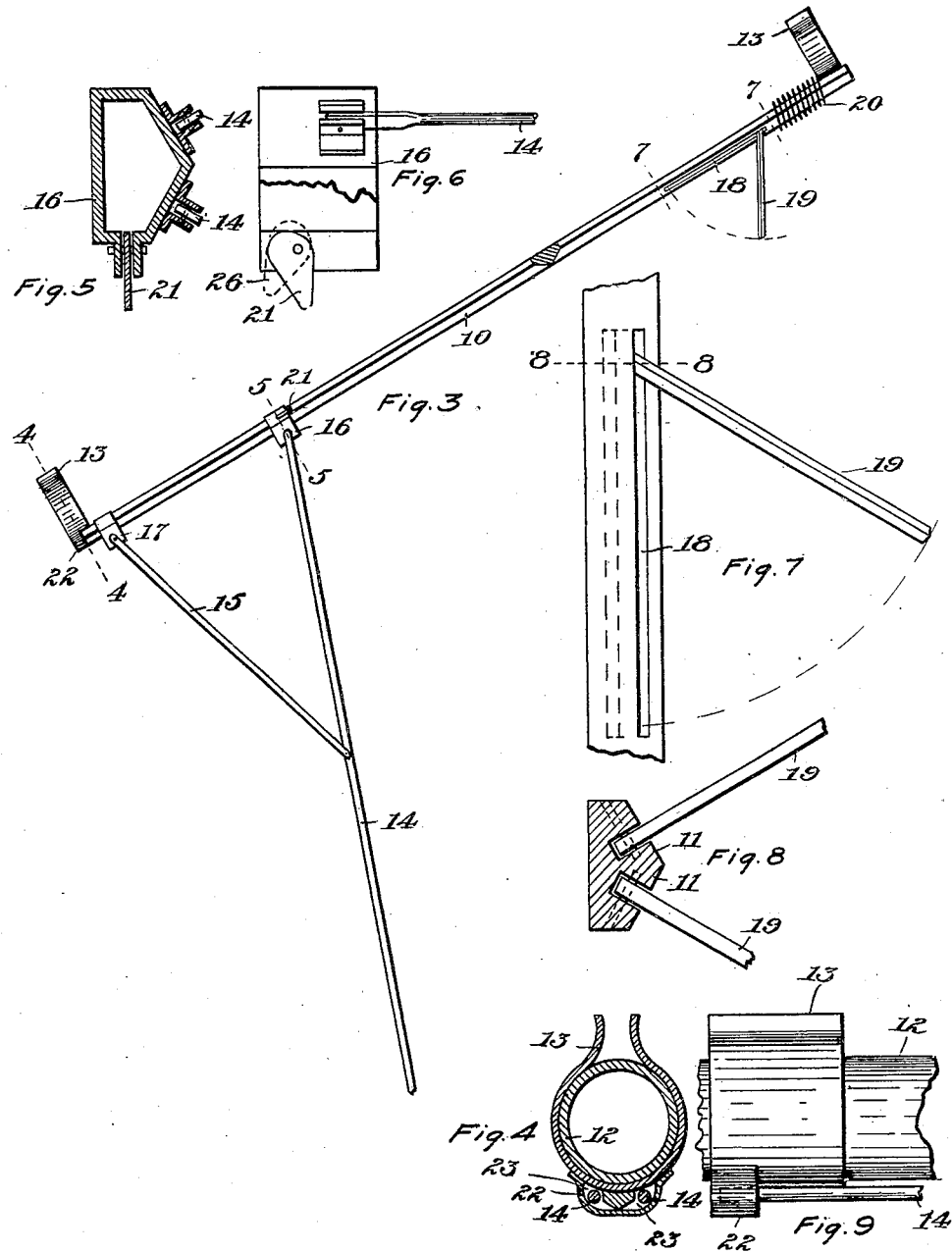

UNITED STATES PATENT OFFICE.

CARL J. HANSEN, OF SPOKANE, WASHINGTON.

BICYCLE-STAND.

No. 921,242.   Specification of Letters Patent.   Patented May 11, 1909.

Application filed October 26, 1908. Serial No. 459,562.

*To all whom it may concern:*

Be it known that I, CARL J. HANSEN, a citizen of the United States, residing at Spokane, in the county of Spokane and State of Washington, have invented certain new and useful Improvements in Bicycle-Stands, of which the following is a specification.

This invention relates to bicycle stands and has for its object to provide a stand that may be attached to and folded up against the frame of a bicycle when not in use and unfolded and applied to brace and retain a bicycle on its wheels when the bicycle is not in motion. This makes it unnecessary to rest a bicycle against a curbing or other support when not in action, but provides the bicycle with a support of its own that is available at all times and places.

The apparatus is attached to the frame of the bicycle on the rod extending diagonally upward from the shaft of the pedal to the upright fork carrying the handle bars.

Figure 1:
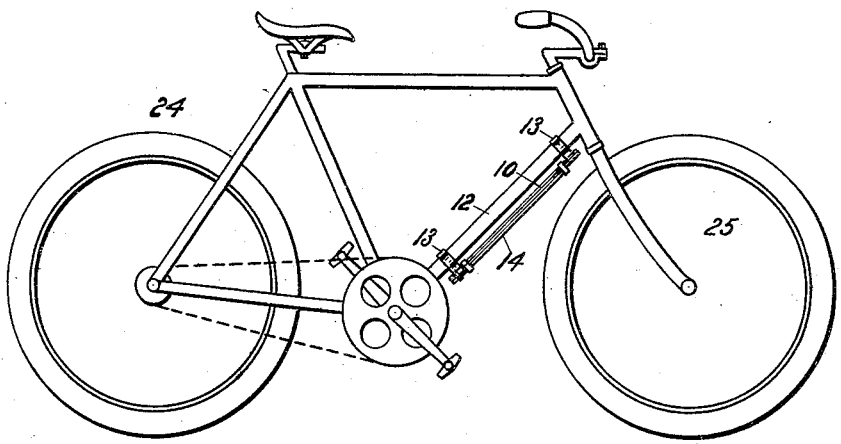
Figure 2:
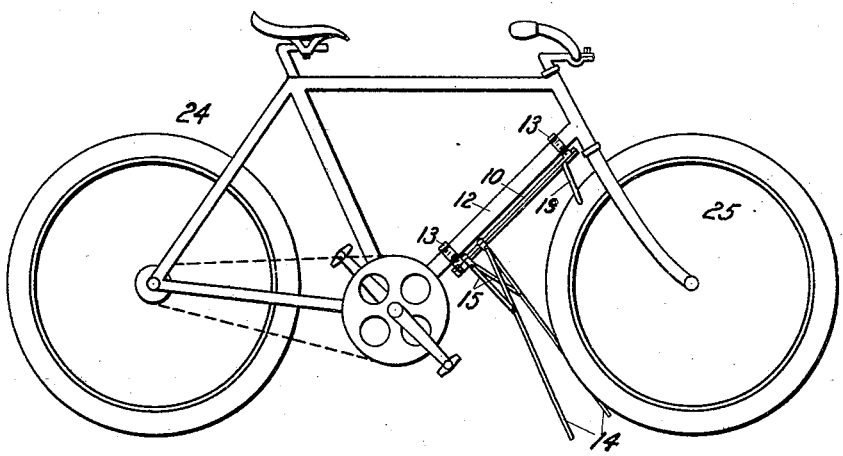

Figure 1 is a side elevation of a bicycle with the apparatus attached and folded to a position that the same would occupy when the bicycle is in motion, Fig. 2, is a side elevation of a bicycle with the apparatus attached and unfolded to the position it would occupy when the bicycle is not in use and is being sustained in an upright position by means of the apparatus, Fig. 3, is an enlarged elevation of the apparatus detached, Fig. 4, is a transverse section of the same taken on the line 4—4 of Fig. 3, Fig. 5, is a transverse section of a sliding guide 16 taken on the line 5—5 of Fig. 3, Fig. 6, is a broken away side elevation of the same, Fig. 7, is an enlarged elevation of that portion of the apparatus shown between the dotted lines 7—7 of Fig. 3, Fig. 8, is a transverse section of that portion of the apparatus shown in Fig. 7 and taken on the dotted line 8—8 thereof, and Fig. 9, is an elevation of the lower end of the oblique rod of the bicycle frame to which the apparatus is attached and showing one end of the apparatus attached thereto.

A bar 10 with beveled edges 11 is secured parallel with and to the diagonal rod 12 of the bicycle frame by means of the springs 13 attached to both ends of the rod 10. Two legs 14 are pinned to a guide 16, the guide 16 adapted to slide upon the rod 10 and to fit the beveled surface 11 thereof. The legs 14 are braced by rods 15 pinned to the legs at one end and to a sliding guide 17, also adapted to fit the surface of the rod 10 and the beveled edges 11 thereof. Two cavities 18 are hollowed out of the beveled edges 11 of the rod 10 in which are pinned at one end two gravity pawls. Encircling the rod 10 at one end thereof is a coil spring 20. To one side of the sliding guide 16 is secured a friction lock 21. To the bottom of the spring 13 at the lower end of the oblique rod 12 is secured a plate 22 with openings 23 adapted for receiving the ends of the legs 14 when in a folded position.

With the apparatus in a position shown in Figs. 2 and 3 the same would retain a bicycle 24 in an upright position and the front wheel 25 thereof in a longitudinal position therewith, the legs 14 resting against the ground and the pawls 19 engaging both sides of the tire of the front wheel.

When it is desired to fold the apparatus, it is only necessary to move the sliding guides 16 and 17 upwardly upon the rod 10 a sufficient distance to permit the legs 14 being drawn in front of the openings 23 in the plate 22 and then to push them backward far enough so that the legs 14 will drop into the openings 23 which will serve to retain them in that position, while the gravity pawls 19 may be dropped back into the cavities 18 and the coil spring 20 dropped over the same to retain them in place and the apparatus will be folded and out of the way and the bicycle may then be used for riding purposes without hindrance by reason of the same. The friction lock 21 is so arranged that one needs only to tip it slightly backward to a position shown by the dotted lines 26 in order to lock the sliding guide 16 firmly against the rod 10 which may be found convenient in order to hold the legs 14 rigid and in place when the apparatus is in use.

Having thus described my invention, what I claim as new and useful and desire to secure by Letters Patent, is:

A bicycle stand consisting of a rod with springs attached thereto adapted to clamp the same to the frame of a bicycle, said rod having sliding guides encircling the same to which are attached legs adapted to reach to the ground and braces supporting the legs, the sliding guides provided with a friction lock adapted to bind the guides to the rod and be manually released at will, said rod also provided with gravity pawls pinned at one end in cavities in the said rod and adapted to engage the sides of the tire of the front wheel of the bicycle, a coil spring encircling the rod and adapted to retain the pawls longitudinally in the cavities of the rod when the pawls are not in use, and pockets provided at one end of the rod adapted to retain the lower ends of the legs when the apparatus is not in use, substantially as described.

In testimony whereof I affix my signature, in presence of two witnesses.

CARL J. HANSEN.

Witnesses:
C. G. PENCE,
MARY SHOLDERER.